A. LOHMANN.
Sad-Iron.
No. 208,322.                    Patented Sept. 24, 1878.
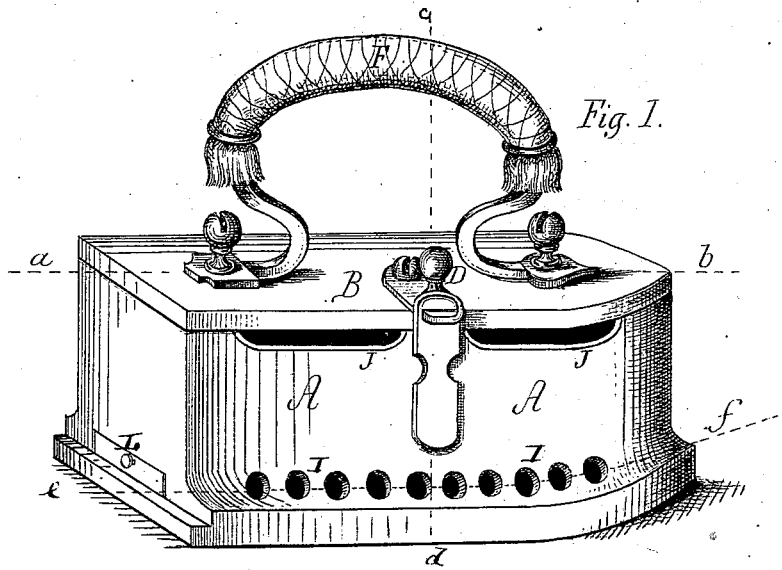
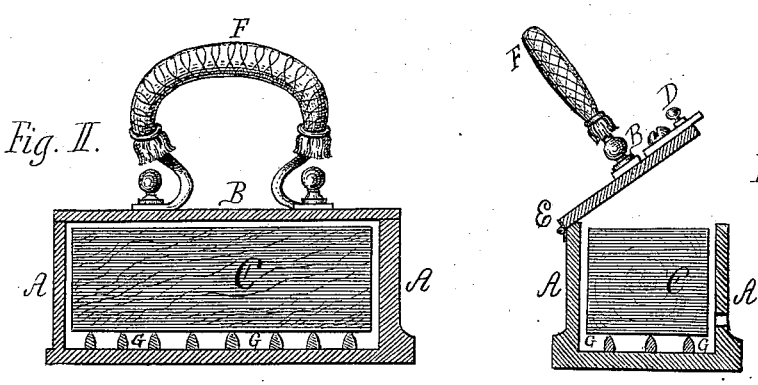
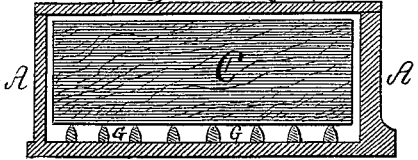
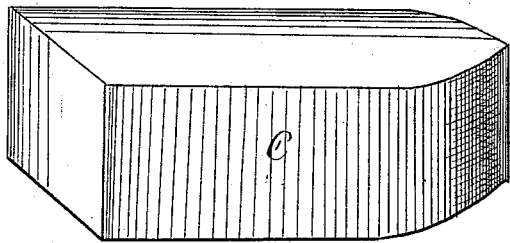
Witnesses                                                Inventor

UNITED STATES PATENT OFFICE.

ALBERT LOHMANN, OF ISERLOHN, PRUSSIA, GERMANY.

IMPROVEMENT IN SAD-IRONS.

Specification forming part of Letters Patent No. 208,322, dated September 24, 1878; application filed February 19, 1878.

*To all whom it may concern:*

Be it known that I, ALBERT LOHMANN, of Iserlohn, Prussia, Germany, have invented a new and useful Improvement in Sad-Irons, of which the following is a specification:

This invention relates to a new self-heating sad-iron, which is so constructed that it will remain heated for a considerable length of time by means of a self-consuming heater placed therein; and the invention consists in combining, with a sad-iron having a pointed front, perforated sides, and upwardly-projecting pins on the bottom, a combustible solid block, which is also pointed in the front, and has flat sides and back, so as to correspond to the interior form of the sad-iron and heat it uniformly.

In the drawing, Figure 1 represents a perspective view of my improved sad-iron. Fig. 2 is a longitudinal vertical section of the same, and Fig. 3 a vertical transverse section of the same. Fig. 4 is a detailed perspective view of the bottom of the sad-iron, showing the same detached from the sides and ends thereof, and Fig. 5 is a detailed perspective view of the inner combustible heater.

Similar letters of reference indicate corresponding parts in all the figures.

The letter A in the drawing represents the body of the sad-iron, the same being made of iron, of the usual shape, and with a flat bottom and pointed end, such as is customary in sad-irons. The body of the sad-iron is hollow, and is provided with a folding lid, B, which can be closed by a suitable bolt or catch, D. F is the handle, firmly attached to the cover B.

The bottom of the sad-iron has upwardly-projecting pins or prongs G G, which are evenly distributed along the same, extending from end to end. These pins serve to support the block C, that constitutes the heater of the sad-iron. The sides of the sad-iron are perforated, as shown at I I and J J in the drawing, to admit air to the burning heater.

Now, the block or heater C is to be made of combustible substance, which, when ignited, will gradually burn away, and which, while so burning, will yield its heat to the sad-iron and keep the same in proper condition for use during a considerable length of time.

In order to uniformly heat the sad-iron, the block C is made with a flat back and flat sides, but with a pointed front, thus corresponding to the shape of the pointed cavity in the sad-iron, and causing the pointed front end of the latter to be heated to the same extent as the rear and sides. Were it not for this peculiar shape of the block C, the front pointed end of the sad-iron would remain cold, or, at any rate, cooler than the remainder, and the usefulness of the instrument would thereby be impaired, as it could not be used for ironing flutes and the like along its pointed front. I have found that a block or heater, C, properly shaped and compounded, will keep a sad-iron uniformly heated for ten hours without requiring any change or replacement.

The bottom of the sad-iron will always be the hottest portion thereof, because the metal pins G G convey the heat thereto; but yet the iron can also be used along its sides or front wherever desired for the purpose of smoothing parts of fabrics brought into contact with it.

The ashes which accumulate within the sad-iron by the gradual consumption of the block C can be removed through a small door, L, at the back, as indicated in Fig. 1.

I am aware that sad-irons constructed with chimneys and adapted to burn ordinary fuel have already been in use, and I do not claim them.

My invention differs principally therefrom in the use of a combustible block made with flat sides and back and pointed front, in combination with a sad-iron of corresponding form, whereby I am enabled to dispense with the chimney or funnel, and to uniformly heat the bottom, front, and sides of the sad-iron by a substance which will not smoke or smell, and which nevertheless will slowly burn away during its combustion, and will give off its heat to the surrounding air.

I claim—

The combination of the hollow sad-iron, having lid, perforated sides, pointed front, and upwardly-projecting pins G G on its bottom, with the solid combustible heater C, made in one piece, with straight sides and back and pointed front, to correspond to the interior cavity of the sad-iron, substantially as and for the purpose herein shown and described.

In testimony whereof I have signed my name to this specification in the presence of two subscribing witnesses.

ALBERT LOHMANN.

Witnesses:
WILHELM NÖRRENBERG,
ERNST SCHREIBER.